United States Patent [19]
Van Doorn
[11] 3,774,118
[45] Nov. 20, 1973

[54] LINE AMPLIFIER

[75] Inventor: Willem Van Doorn, Hilversum, Netherlands
[73] Assignee: U.S. Philips Corporation, New York, N.Y.

[22] Filed: Mar. 20, 1972
[21] Appl. No.: 236,376

[30] Foreign Application Priority Data
Mar. 27, 1971 Netherlands ........ 7104149

[52] U.S. Cl. ........ 330/28, 330/29, 330/52, 330/88, 330/95, 330/107, 330/137
[51] Int. Cl. ........ H03f 1/08
[58] Field of Search ........ 330/28, 29, 52, 88, 330/95, 105, 107, 109, 137, 143; 325/319, 414; 333/15, 28 R; 334/15

[56] References Cited
UNITED STATES PATENTS
2,337,423 12/1943 Stillwell ........ 330/88
3,684,977 8/1972 Viles ........ 333/15 X
3,671,886 6/1972 Fudemoto et al. ........ 330/29 X
3,492,595 1/1970 Norman ........ 330/28 X

*Primary Examiner*—Roy Lake
*Assistant Examiner*—James B. Mullins
*Attorney*—Frank R. Trifari

[57] ABSTRACT

A line amplifier constituted by a transistor amplifier comprising a plurality of stages a number of which is locally fed back by a feedback impedance incorporated in the emitter circuit of these stages, and provided with a level control device which is constituted by these feedback impedances which to this end are each formed as controllable capacitive two-terminal networks the control members of which consist of voltage-dependent diodes arranged pairwise in a push-pull configuration, and a control voltage distribution network which distributes the control voltage applied thereto over the diode pairs in such a manner that the ratio between the time constants of the capacitive two-terminal networks remains substantially constant when the control voltage varies.

5 Claims, 3 Drawing Figures

LINE AMPLIFIER

Figure 1:
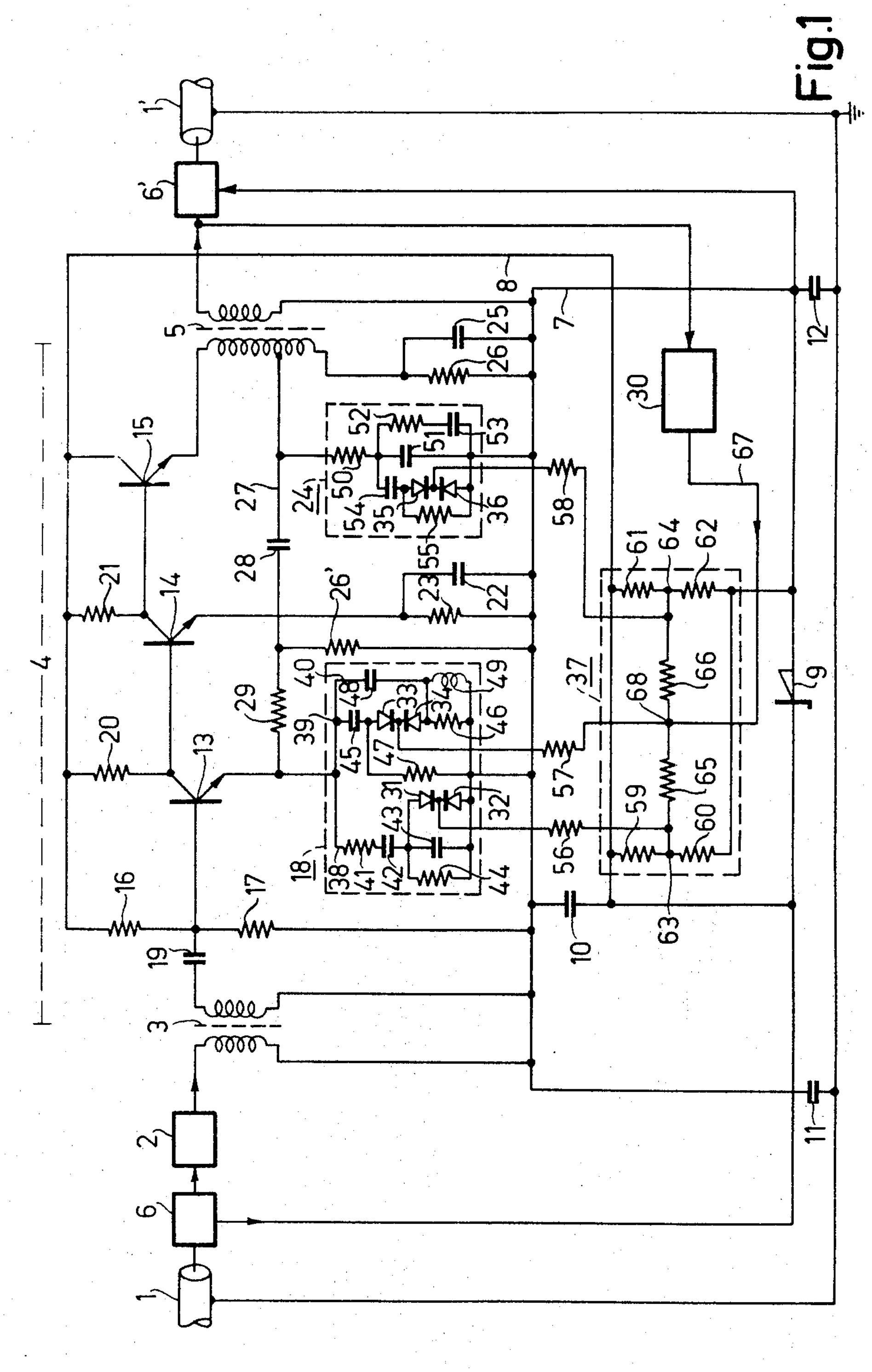

The invention relates to a line amplifier for use in a transmission system for transmitting signals located in a broad frequency band through a coaxial cable, which line amplifier comprises a plurality of transistor amplifier stages a number of which are locally fed back through feedback impedances incorporated in the emitter circuits of the relevant amplifier stages, the line amplifier being furthermore provided with an over-all feedback circuit connecting the output to the input, and level control means to which a signal voltage varying as a function of a received pilot signal is applied as a control voltage.

To compensate for level variations in the transmitted signals as caused mainly by attenuation variations of the cable, such, as may result from weather influences, temperature fluctuations etc., it is common practice to incorporate at given distances in the transmission path an amplifier which is provided with the necessary level control means permitting control in response to a received pilot signal. In known line amplifiers of this kind the level control means comprises a temperature compensation network (Bode network) which is terminated by an adjusting member in the form of a voltage-controlled resistor to which a signal voltage dependent on the pilot signal is applied as a control signal. In transmission systems of very broad frequency band, say, some tens of MHz as required for accomodating, for example, a few thousand carrier telephony channels, television channels and the like, these known controlled line amplifiers are found to be insufficiently accurate and not very reliable by reason of the fact that the adjusting member, usually a lamp or a thermistor, has certain drawbacks in practice. The thermistors for instance have large tolerances and their operating point changes due to ageing. With lamps these drawbacks are less pronounced but for use in systems employing high frequencies they are impracticable because of the high inductance of the filament coil. Moreover, both the lamp and the thermistor produce additional noise due to their high dissipation.

It is an object of the present invention to provide a novel conception of a line amplifier of the type described in the preamble which, even if used in a system for the transmission of a very broad frequency band, provides a very reliable and very accurate level control over the entire control range.

According to the invention such a line amplifier is formed in such a manner that the feedback impedances incorporated in the local feedback circuits are constituted by controllable capacitive two-terminal networks whose control members consisting of a variable capacitor are constituted by varactor diodes which are pairwise arranged in a push-pull configuration with respect to alternating voltages so as to suppress second-order distortion, the level control means comprising the said two-terminal networks and a control voltage distribution network having outputs coupled to each of the push-pull arranged diode pairs, and an input to which the said control voltage is applied said distribution network distributing said control voltage over the respective varactor diodes in a manner such that the ratio of the time constants of the capacitive two-terminal networks remains substantially unchanged so that the amplification characteristic of the amplifier through the entire control range of the control voltage, remains accurately equal to the frequency-and temperature-dependent variation of the attenuation curve of the cable section preceding the line amplifier.

Figure 2:
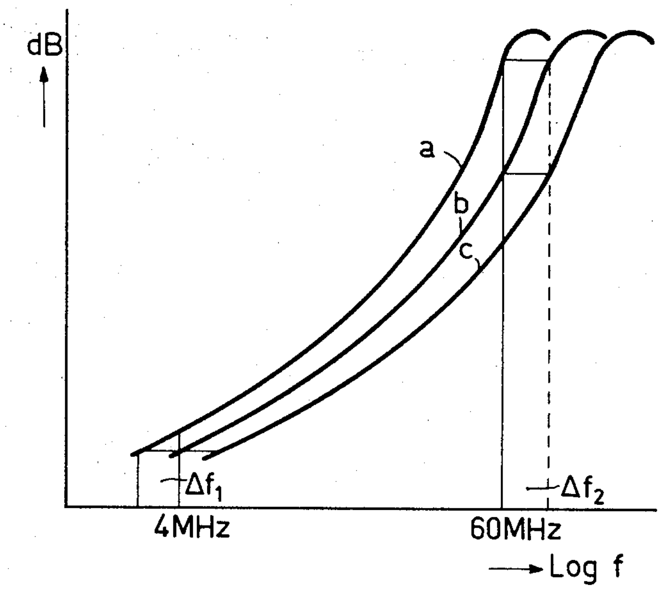
Figure 3:
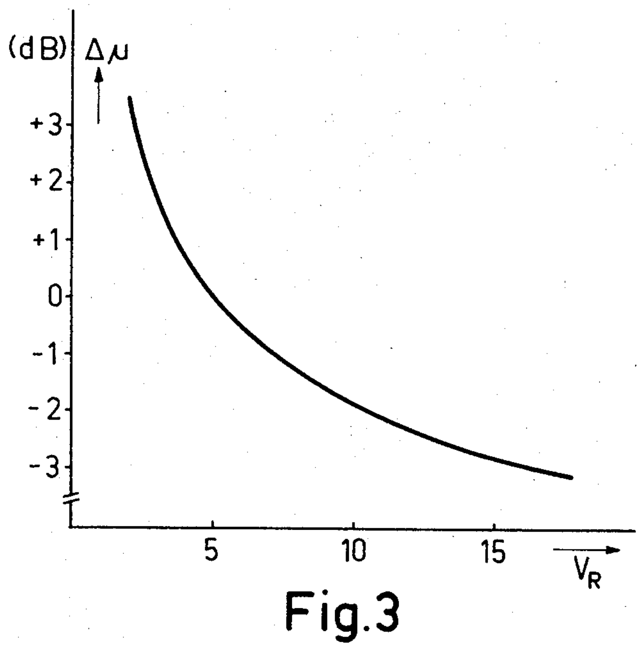

In order that the invention may be readily carried into effect, an embodiment thereof will now be described in detail by way of example with reference to the accompanying diagrammatic drawings, in which:

FIG. 1 shows a repeater station for carrier telephony traffic through a coaxial cable in which the repeater is constituted by a line amplifier according to the invention; and FIGS. 2 and 3 show a number of amplifier characteristics of the line amplifier of FIG. 1.

The repeater station shown in FIG. 1 forms part of a carrier telephony system which is adapted for carrier telephony traffic through a coaxial cable 1,1', for example, for the transmission of 10,800 channels in the frequency band of from 4 MHz to 60 MHz.

The incoming carrier telephony signals originating from the coaxial cable 1 are applied through an equalizing network 2 to the input transformer 3 of a line amplifier 4 whose output circuit 5 is connected to the outgoing coaxial cable 1'. This line amplifier is fed from a direct current transmitted simultaneously with the high-frequency signals through the coaxial cable. To this end supply current separating filters 6, 6' are provided between the coaxial cable 1 and the equalizing network 2, and between output transformer 5 and coaxial cable 1', respectively. The direct current is separated from the high-frequency signals with the aid of these filters and is applied through leads 7,8 to the supply circuit of amplifier 4 which circuit is bypassed with respect to alternating voltages through grounded capacitors 10, 11 and 12 and is bridged by a normally blocked diode 9. The line repeater is formed as a transistor amplifier having a controllable amplification factor and comprises the cascade arrangement of an input amplifier stage 13, an intermediate amplifier stage 14, and a final stage 15. In the embodiment shown the bias for the base electrode of the transistor in the first stage 13 is taken from the function of resistors 16 and 17 which are connected as a potential divider to the supply leads 7 and 8. The input stage is locally fed back by means of a feedback impedance 18 incorporated in the emitter circuit of the transistor. The carrier telephony signals coming in through the input transformer 3 are applied through a coupling capacitor 19 to the base electrode of the input stage 13. The amplified carrier telephony signals of this stage occur at the collector resistor 20 and are applied for further amplification to the intermediate amplifier stage 14 whose transistor is provided with a collector resistor 21 and an emitter resistor 23 shunted by a capacitor 22. The carrier telephony signals occurring at the collector resistor 21 of the intermediate amplifier stage 14 are finally applied to the power amplifying stage 15 which is locally fed back by a feedback impedance 24 incorporated in the emitter circuit of the transistor. Stage 15 is coupled through the output transformer 5 to the load constituted by the characteristic impedance of the cable section 1' following the line amplifier.

To satisfy the stringent requirements imposed on a line amplifier, namely:

the prescribed amplification across the frequency band of from 4 to 60 MHz, the low non-linear distortion across the frequency band of from 4 to 60 MHz and the accurate adaptation of input and output impedance, the amplifier in addition to the local feedback, circuits comprises combined voltage and current feedback circuit. To this end a series resistor 26 shunted by a capacitor 25 is arranged in series with the primary winding of the output transformer 5 and the amplifier output circuit is coupled to the emitter of the input amplifier stage 13 through a feedback circuit 27 including a capacitor 28 in series with a resistor 29.

To compensate for level variations in the transmitted signals, which variations are caused by attenuation variations in the transmission path the line amplifier further comprises level control means controlled by a pilot signal which is co-transmitted with the speech signals through the coaxial cable 1. The pilot signal consists of a carrier of 3.2 MHz which is modulated with a variable frequency of from 5 to 35 kHz from which the control voltage for the control of the level control means is derived. After amplification in the line amplifier 4 the co-transmitted pilot signal is applied to a pilot signal receiver 30 connected to the line amplifier output. This receiver selects the pilot signal and demodulates it to generate a direct control voltage, which varies with the modulation frequency, for controlling the level control means.

According to the invention a particularly favourable and advantageous controlled line amplifier is obtained if the feedback impedances 18, 24 incorporated in the local feedback circuits are constituted by controllable capacitive two-terminal networks whose control members consisting of a variable capacitor are constituted by varactor diodes 31–36 which are arranged pairwise in a push-pull configuration with respect to alternating voltage so as to suppress second-order distortion, and if the level control means comprises these two-terminal networks as well as a control voltage distribution network 37 having outputs coupled to each of the push-pull arranged diode pairs, and an input to which the said control voltage is applied, said network distributing said control voltage over the respective varactor diodes in a manner such that the ratio of the time constants of the capacitive two-terminal networks remains substantially unchanged, so that the amplification characteristic of the amplifier, through the entire control range of the control voltage, is always accurately equal to the frequency and temperature-dependent variation of the attenuation curve of the cable section preceding the amplifier.

In the embodiment shown in FIG. 1 the amplifier comprises two capacitive two terminal networks 18 and 24 which are incorporated in the local feedback of the input stage 13 and the output stage 15, respectively.

The control members forming part of these capacitive two terminal networks are constituted by varactor diodes which are pairwise arranged in a push-pull configuration. The number of pairs of push-pull arranged diodes associated with one and the same control member is of course dependent on the circuit parameters and is also determined by the type of diode used. In the Figure each control member is represented for the sake of simplicity by a single pair of push-pull arranged varactor diodes.

In the embodiment shown the capacitive two terminal network 18 is constituted by three parallel-arranged impedance branches 38, 39, 40. The impedance branch 38 comprises the series arrangement of a resistor 41, DC-blocking capacitor 42 and the varactor diodes 31 and 32 shunted by a capacitor 43 and a leakage resistor 44. The impedance branch 39 comprises the series arrangement of a DC-blocking capacitor 45, the push-pull arranged diodes 33, 34 and resistor 46, the diodes and resistor 46 being shunted by a leakage resistor 47. The impedance branch 40 of the capacitive two terminal network 18 comprises the series arrangement of a capacitor 48 and a coil 49. The capacitive two terminal network 24 comprises the series arrangement of a resistor 50 and a capacitor 51, the latter being shunted at one hand by the series arrangement of a resistor 52 and a capacitor 53 and at the other hand by the series arrangement of a DC-blocking capacitor 54 and the diodes 35, 36 which are shunted by a resistor 55. The capacitors 42, 45 and 54 serve to cut off the direct current which therefore flows through the resistors 26, 26'. The impedance branches 38 and 39 of the two-terminal network 18 and the impedance branch of the two-terminal network 24 have mutually different RC values, the branches of succeeding RC values being contributive in adjoining portions of the total frequency bands to the slope of the amplifier characteristic. More particularly these impedance branches are proportioned in a manner such that for the nominal capacitance of the control members constituted by the varactor diode pairs 31, 32; 33, 34; and 35, 36 the amplification characteristic is accurately equal to the nominal attenuation characteristic of the cable section 1 preceding the amplifier 4.

These control members are respectively connected through decoupling resistors 56, 57, 58 to the control voltage distribution network 37. In the embodiment shown this control voltage distribution network comprises a first branch having resistors 59 and 60, a second branch having resistors 61 and 62 connected in parallel, to said first branch and to the zener diode 9 included in the supply lead 7. The mutual interconnections 63 and 64 of the resistor pairs 59, 60 and 61, 62 are connected together through a third branch having resistors 65 and 66. The control voltage occurring at the output of the pilot receiver 30 is applied through the lead 67 to the mutual interconnection 68 of the resistors 65 and 66, while the control members included in the capacitive two-terminal networks are connected to mutually different interconnections of the control voltage distribution network. Thus the control member constituted by the diodes 31 and 32 is connected through the decoupling resistor 56 to the mutual interconnection 63 and the control member constituted by the diodes 33 and 34 is connected to the interconnection 68 through the decoupling resistor 57, while the control member constituted by the diodes 35 and 36 is connected through the decoupling resistor 58 to the mutual interconnection 64. In the embodiment shown in FIG. 1 the capacitances of the control members incorporated in the two-terminal networks are of the same order so that the varactor diodes used as control members may be all of the same type. The control voltage distribution network distributes the control voltage applied thereto over these control members in such a manner that their capacitances in case of variation of the control voltage over the entire control range are all multiplied by mutually the same factor, which results in a shift of the amplification characteristic in the horizontal direction along the frequency scale. To explain the operation described, FIG. 2 shows curves *a*, *b* and *c* representing amplification characteristics of the described amplifier in which the amplification is shown as a function of the logarithm of the frequency. Curves *a* and *c* show the variation of the amplification characteristic at the maximum and minimum control voltages respectively, while curves *b* shows the variation of the nominal amplification characteristic as occurs at the nominal control voltage. If the amplification in the case of this nominal characteristic *b* is proportional to the square root of the frequency, the frequency-shifted characteristics *a* and *c* maintain the same proportionality and the mutual difference in amplification accurately corresponds to the required temperature compensation variation and/or length variation of the cable.

FIG. 2 also shows that when shifting the characteristic, the proportionality to $\sqrt{f}$ at the extreme frequencies of the actual frequency band, in this case 4 and 60 MHz, is only maintained if the nominal characteristic *b* remains proportional to $\sqrt{f}$ over an extra frequency range $\Delta f_1$ below and $\Delta f_2$ above this actual frequency band. It is apparent from FIG. 2 that when the amplification is to be controlled over + and − 10 percent in accordance with the $\sqrt{f}$shaped characteristic, this implies a frequency shift of + and − 20 percent ( $\sqrt{f}$). A simple calculation shows that the amplification characteristic must then continue above the band up to 72 MHz and below the band to 3.2 MHz which corresponds to a bandwidth increase of from 4 to 4.4 octaves. When using the steps according to the invention variable capacitors in the form of varactor diodes are used as control members which, unlike the NTC resistors or incandescent lamps commonly used for level control, have considerable advantages. These varactor diodes do not introduce extra noise and a temperature compensation network (Bode network) is not required while at the same time they are very well suited for use at high frequenies. Since there is no dissipation, there is no temperature increase in this type of control member so that the control member ages less rapidly. In addition to these advantages which are very important for the reliability and cost of the line amplifier according to the invention, the control voltage distribution network used in this amplifier renders it possible to compensate for such tolerances in the varactor diodes. There is the addition possibility of introducing a simple memory circuit because if the pilot signal is lost only the last applied control voltage should be maintained, for example, with the aid of a capacitor. To illustrate the controlled line amplifier described hereinbefore a few data are mentioned below for equipment used in practice.

| | |
|---|---|
| Variable capacitor **31, 32** | 3×2 BA102 |
| Variable capacitor **33, 34** | 4×3 BA102 |
| Variable capacitor **35, 36** | 4×2 BA102 |
| Capacitor **48** | 68.1 pF |
| Capacitor **43** | 25 pF |
| Capacitor **51** | 133 pF |
| Capacitor **53** | 270 pF |
| Resistors **60, 62** and **65** | 100 k ohm |
| Resistor **59** and **61** | 274 k ohm |
| Resistor **66** | 2.61 k ohm |
| Resistor **56, 57** and **58** | 51.1 k ohm |

Nominal control voltage 3.9 V variable between 1 and 14 V.

As stated, this control voltage is derived from a variable frequency of from 5 to 35 kHz which is modulated on a carrier located just below the telephony band (4–60 MHz). The relationship between the value of the control voltage and the frequency is given by the hyperbolic function $V_R = C_1/f$ in which $C_1$ = a constant. FIG. 3 shows the amplification curve varying as a function of the conrol voltage $V_R$ at a frequency of 60 MHz. As this curve shows, the amplification variation $\Delta\ \mu$ as a function of the control voltage is approximately a hyperbolic function. Consequently we can write for the amplification variation:

$$\Delta\ \mu = C_2/V_R = C_2/C_1 \cdot f,$$

which means that the amplification variation is proportional to the control frequency.

Finally it may be noted that the capacitive two-terminal networks shown in the embodiment of FIG. 1 may alternatively be formed differently, for example, the push-pull circuit of the varactor diodes used therein may be formed in an antiparallel arrangement instead of in an antiseries arrangement so that the number of required diodes can be reduced.

What is claimed is:

1. A line amplifier for use in a transmission system for transmitting signals in a broad frequency band, comprising:

a plurality of cascaded transistor amplifying stages at least two of which each have a frequency compensation impedence network in the emitter circuit thereof to compensate for frequency dependent signal losses, said networks each including at least one voltage controlled capacitance element;

means for generating an amplification control voltage;

a voltage dividing network responsive to said amplification control voltage for generating a capacitance control voltage for each of said voltage controlled capacitances and for applying said capacitance control voltages thereto, said capacitance control voltages remaining in substantially constant ratios with one another and with said amplification control voltage, thereby resulting in substantially constant ratios between the time constants associated with said capacitance which produces a substantially fixed though shifting frequency response curve for said amplifier over said broad band with the overall gain being controlled by said amplification control voltage.

2. A line amplifier as claimed in claim 1 wherein said voltage controlled capacitances are pairs of varactor diodes arranged in push-pull configuration.

3. A line amplifier as claimed in claim 1 wherein at least one of said frequency compensation impedance networks includes more than one voltage controlled capacitance.

4. A line amplifier as claimed in claim 1 wherein said amplification control voltage is generated from a signal transmitted over said transmission system.

5. A line amplifier as claimed in claim 1 further characterized by signal feedback means connected between the first and last cascaded amplifying stages.

* * * * *